May 28, 1957    R. GOODMAN ET AL    2,793,989
WAVE GUIDE STRUCTURE AND METHOD OF FORMING SAME
Filed Oct. 2, 1952

INVENTORS
Robert Goodman
BY Victor Baptist
Harold D. Rice
Alfred E. Gage
ATTORNEY

United States Patent Office 2,793,989
Patented May 28, 1957

2,793,989
WAVE GUIDE STRUCTURE AND METHOD OF FORMING SAME

Robert Goodman and Victor P. Baptist, Stamford, and Harold D. Rice, New Canaan, Conn., assignors to Gar Precision Parts, Inc., Stamford, Conn., a corporation of Delaware Application October 2, 1952, Serial No. 312,704

7 Claims. (Cl. 204—9)

This invention relates to wave guide components and a method of forming such components. More particularly, the invention is directed to a novel method of integrating preformed fittings or connections with wave guides.

So-called wave guides used in microwave signalling have a variety of shapes or contours depending upon the particular electronic functions or factors involved. Among the more commonly used forms are straight wave guides, elbows, transitional sections, hybrids, etc. The inputs and outputs, as well as intermediate sections of the components, are provided with coupling or connecting fittings usually flanged. These fittings are actually terminal members by means of which a wave guide component may be attached to adjacent parts of an electronic system.

The most important criteria in the manufacturing of such components are the maintenance of accurate internal dimensions and the provision of accurately contoured interior cross sections. The fittings or connections are usually preformed by casting and/or machining from electrically conductive metals, for example, brass, bronze, copper, aluminum, etc. The passages may be formed from thin walled tubing of copper, brass, nickel, silver, and the like, accurately shaped or dimensioned. By the term "tubing" or "tubular" as used herein is meant an element having a hollow cross section whether circular, polygonal, or irregular.

Many methods are used to form the tubular passages. In the more complicated shapes, electroforming has been applied. In this latter process, a layer of metal is electrodeposited to a preset thickness onto an accurately formed mandrel of a suitable material which may be removed from the composite structure by heating, chemical action, or other means. The mandrel is chemically treated or coated so that the electrodeposited coating does not unite therewith. After such formation, the mandrel is destroyed by melting or dissolving, or is otherwise withdrawn out of the composite structure, leaving a tubular shape of accurate internal contour and dimensions.

However, joining of the tubular passages to the preformed fittings or coupling elements requires great skill and care to maintain the desired interior contour and dimensions. Most commonly, the fittings are soldered or brazed to the tubes. As this involves heating of the components, it is practically impossible to prevent distortion of the parts with consequent deterioration of electromagnetic wave transmission. This is more particularly true when soldered joints must be formed inside the components, as is frequently the case with the more complicated shapes. Any distortion of the interior surfaces of the components results in less effective and less accurate functioning of the components in service. While many attempts have been made to solve these manufacturing difficulties, a satisfactory solution has not hitherto been available.

In accordance with the present invention, the foregoing difficulties are avoided and accurate interior dimensions and contours are assured by a novel method of forming the tubular component. The mandrel used in electroforming the tubular passages is provided with extensions formed to have an accurate fit into the fittings or coupling elements. The latter are accurately positioned onto the mandrel before the electroforming is commenced. The mandrel is chemically treated or coated to prevent integration of the electroformed layer therewith, while the fitting is chemically treated or coated to assure bonding of the electroformed layer thereto. The electroformed layer is then deposited onto the mandrel and forms an integral chemical bond with the coupling elements or fittings. When the mandrel is removed, the component is complete, thus obviating any necessity for soldering or brazing the fittings to the electroformed tubing. The component is thus formed more rapidly, more inexpensively, and more accurately and uniformly than is possible with present methods.

For an understanding of the invention principles, reference is made to the following description of a typical embodiment thereof as illustrated in the accompanying drawings. In the drawing.

While the invention is generally applicable to any microwave guide section, such as those mentioned above, differential couplers, duplexers or "rat races," magic tees, etc., it will be described, by way of example only, as applied to an elbow having a flanged coupler at each end.

Figures 1, 2:
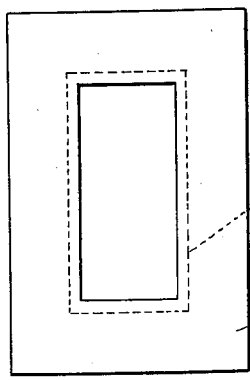
Figs. 1 and 2 are front and side elevation views, respectively, of a typical flanged preformed fitting usable with the present invention.

Referring to Figs. 1 and 2, a typical coupling element comprises a preformed terminal in the form of a flanged member 10 of aluminum, copper, brass, magnesium, silver, or other electrically conductive material. Element 10 is shown as having a rectangular tubular body 11 and a peripheral mounting flange 12 made flush for accurate coupling to a similar flange on another component.

Figure 3:
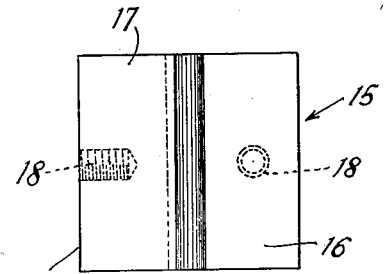
Figs. 3 and 4 are top plan and side elevation views of a mandrel formed in accordance with the invention.
Figure 4:
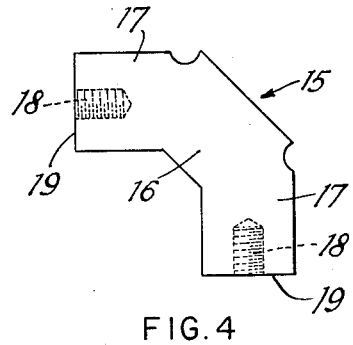

The mandrel 15, illustrated in Figs. 3 and 4, is formed of a suitable material which may be removed from the composite structure by heating, chemical action, or other means. For example, mandrel 15 may be a low melting point metal or alloy, or may be a suitable plastic. Mandrel 15, in the present instance, is accurately formed as an elbow having the desired intermediate cross section 16 and end legs 17 accurately shaped and dimensioned to have a tight fit into body 11 of fitting 10. Legs 17 are longer than is usual, by the length of body 11. Threaded holes 18 are formed in each end face 19 of mandrel 15 for a purpose to be described.

Figures 5, 6:
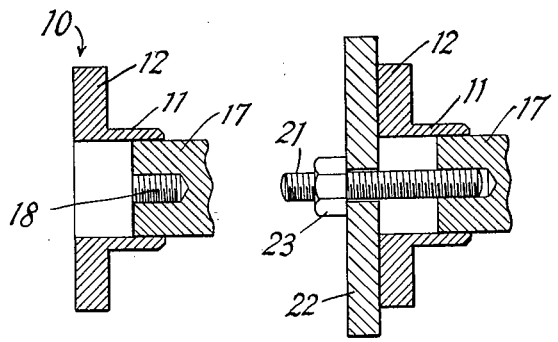
Figs. 5 and 6 are sectional views illustrating successive steps in accurately positioning a fitting on the mandrel.

The bodies 11 of fittings 10 are fitted partially over legs 17, as shown in Fig. 5. A bolt or stud 21 is then threaded into each hole 18 and a flat ground apertured plate 22 is placed over each bolt and against each flange 12. Nuts 23 are then applied to studs 21 and run up to draw the mandrel end faces against flanges 12, as shown in Fig. 6.

Mandrel 15 is chemically treated so that the electroformed coating will not bond thereto. The flanges 12 of fittings 10, plates 22, studs 23, and nuts 44 are suitably coated or marked off with a non-conductive paint or coating, as at 20, to prevent contact of the electrodeposited metal therewith. Coating 20 completely covers the backs of flanges 12 extending into the corner formed by flanges 12 and bodies 11. However, bodies 11 are left uncoated so that the deposited metal will be integrally chemically bonded thereto.

Figure 7:
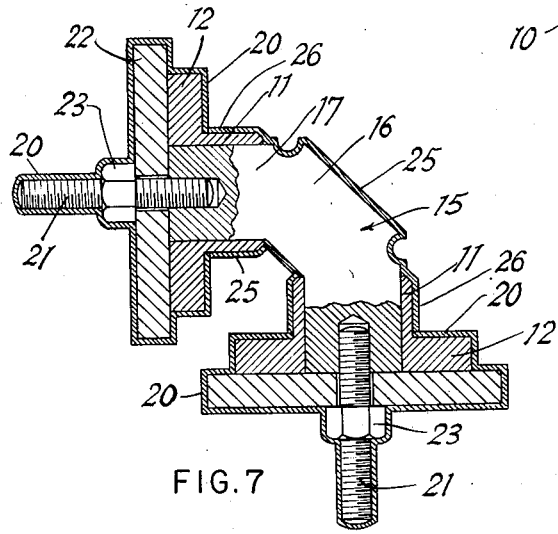
Fig. 7 is a sectional view illustrating the electroformed component before removal of the mandrel.

The composite assembly of mandrel 15 with fittings 10 is then placed in an electroforming bath and a metal layer 25 of the desired thickness is deposited on the treated exposed surface of mandrel 15 and in bonding relation onto bodies 11. This coating forms an integral chemical electrolytic bond with bodies 11 of fittings 10, as shown in Fig. 7, to form a sleeve 26 embracing and bonded to the body 11. When coating 25 is the preselected thickness, the assembly is taken from the bath and mandrel 15 removed by melting it out. Melting out of the mandrel is necessitated in the illustrated example, due to the angular shape. However, with straight wave guide sections, the mandrel may simply be pulled out of section 25. The finished component is shown in Fig. 8.

The formation of sleeve 26 integrally electrolytically bonded in extensive surface engagement to the external surface of extension or wave guide portion 11 of fitting 10 is an important feature of the invention. This sleeve, extensively overlapping tubular extension 11 of fitting 10, provides a mechanically strong and rigid union of wave guide section 25 to the fitting. In addition, and due to the accurate telescoping fit of mandrel extension 17 for a preset distance into fitting extension 11, there is an accurately smooth transition between the inner surface of extension 11 and the inner surface of section 25 so that there is no functional line of demarcation between the inside surface of wave guide portion 11 of the terminal 10 and the inside surface of the "grown-in" wave guide section 25, which collectively form the electromagnetic wave transmitting passage.

Figures 8, 9:
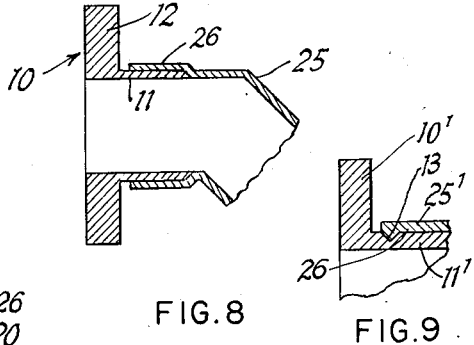
Fig. 8 is a similar, but partial, sectional view of the completed component.
Fig. 9 is a partial sectional view of a completed component illustrating a mechanical interlock between the fitting and the tubing to enhance the physical strength of the component.

In the modification shown in Fig. 9, the physical strength of the composite unit is further enhanced by providing a mechanical interlock between the fitting and the electroformed tubular electromagnetic wave passage. This is effected by providing a V-shape notch 13 in the exterior surface of body 11' of fitting 10' adjacent flange 12'. For example, a notch 13 may be formed at each outer corner of body 11'. The electrodeposited coating 25' not only covers body 11' but enters notch or notches 13 to form a projection or projections interlocked in the notches. This provides a mechanical interlock between the parts supplementing the electrochemical bonding.

The invention method thus both forms the tubular electromagnetic wave transmitting passage and joins the fittings thereto in a single operation. This not only greatly simplifies and expedites the manufacture but also eliminates any localized heating with resultant distortion as would occur with subsequent soldering or brazing. The internal dimensions and contours of the component are accurately maintained and distortion of the wave guide surface is prevented. It should be noted that while internal accuracy and smoothness are provided by the accurately formed mandrel 15, which is most important, the character of the external surface is not important as it has no influence upon the characteristics of the wave guide. The components are integral units of the tubular passages and fittings.

When the fittings are formed of a metal which is relatively passive electrochemically, in accordance with the invention such passive metal fittings are suitably chemically treated to provide an electrochemically non-passive surface thereon. This non-passive surface, during the invention electroforming operation, facilitates the formation of a strong continuous chemical bond between the eelctroformed tubular section and the pre-formed fitting.

While a specific embodiment of the invention has been shown and described in detail to illustrate the application of the invention principles, it will be understood that the invention may be embodied otherwise without departing from such principles.

What is claimed is:

1. The method of making an electronic wave guide which comprises: forming a mandrel with the portion thereof which is to directly receive electrodeposited metal having an external cross section and longitudinal dimensions accurately conforming in every respect to the internal shape and dimensions of the wave passage of the wave guide to be formed, telescoping over at least one end of the mandrel a terminal having therein an opening the inner end of which makes a sufficiently tight fit with the external surface of the mandrel to preclude seepage of electrolyte between them and which opening is accurately shaped and dimensioned to form an uninterrupted continuation of the exposed contiguous portion of the external surface of the mandrel whereby the interior surface of the terminal and the exposed surface of the mandrel collectively correspond to the wave passage to be formed in the wave guide, thereafter electrodepositing an uninterrupted layer of metal simultaneously over the exposed surface of the mandrel and over at least a portion of the exposed surface of the terminal, and thereafter removing the mandrel to leave a wave guide having therein an electromagnetic wave passage a portion of the length of which is formed by the opening of the terminal and which passage is electromagnetically and dimensionally accurate throughout its entire length.

2. The method of claim 1, wherein the opening in the terminal closely conforms to and tightly embraces the mandrel throughout the entire axial length of said opening.

3. The method of claim 1, wherein a portion of the terminal remote from its inner end is coated with a dielectric material prior to the electrodepositing step of the method.

4. The method of claim 1, wherein that portion of the exterior of the terminal over which metal is electrodeposited is provided with a depression with which the electrodeposited layer of metal becomes mechanically interlocked during the electrodeposition step of the method.

5. An electronic wave guide having therein an electromagnetic wave guide passage, a portion of the length of which is the wall surface of an opening through a terminal member and an adjoining portion of the length of which is the interior wall surface of a tubular layer of electrodeposited metal which has an electrolytic bond with said terminal member formed at the time of the electrodepositing of said adjoining portion, both the tubular layer and terminal member having passages positioned end to end and collectively forming an uninterrupted magnetic wave passage, the contiguous portions of which at the point of meeting of the tubular part and terminal member are of identical cross sectional size and shape.

6. An electronic wave guide as in claim 5, wherein the terminal member comprises a flange for attaching the wave guide to another part.

7. An electronic wave guide comprising: a tubular part of electrodeposited metal and a preformed terminal member positioned end to end, with a portion of the tubular part externally overlapping a portion of the terminal member and having an electrolytic bond therewith, both the tubular part and terminal member having passages positioned end to end and collectively forming an uninterrupted magnetic wave passage, the contiguous portions of which at the point of meeting of the tubular part and terminal member are of identical cross sectional size and shape.

References Cited in the file of this patent
UNITED STATES PATENTS

| | | |
|---|---|---|
| 454,381 | Reinfeld | June 16, 1891 |
| 789,342 | Voelk | May 9, 1905 |
| 1,045,718 | Marino | Nov. 26, 1912 |
| 2,074,860 | Ross | Mar. 23, 1937 |
| 2,592,614 | Stoddard | Apr. 15, 1952 |